April 20, 1926.  
F. E. RAITHEL  
FISH GIG  
Filed Oct. 17, 1923   2 Sheets-Sheet 2
1,581,321
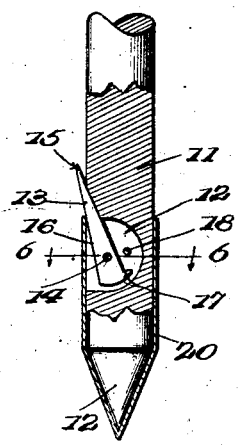
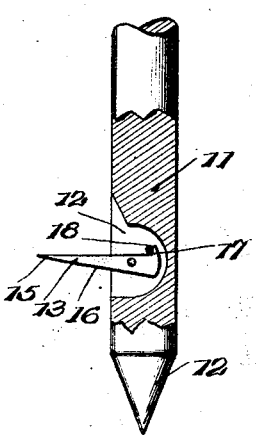
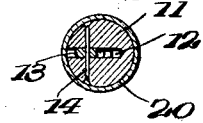
WITNESSES  
R. Q. Thomas
INVENTOR  
Frank E. Raithel  
BY  
ATTORNEYS Patented Apr. 20, 1926.

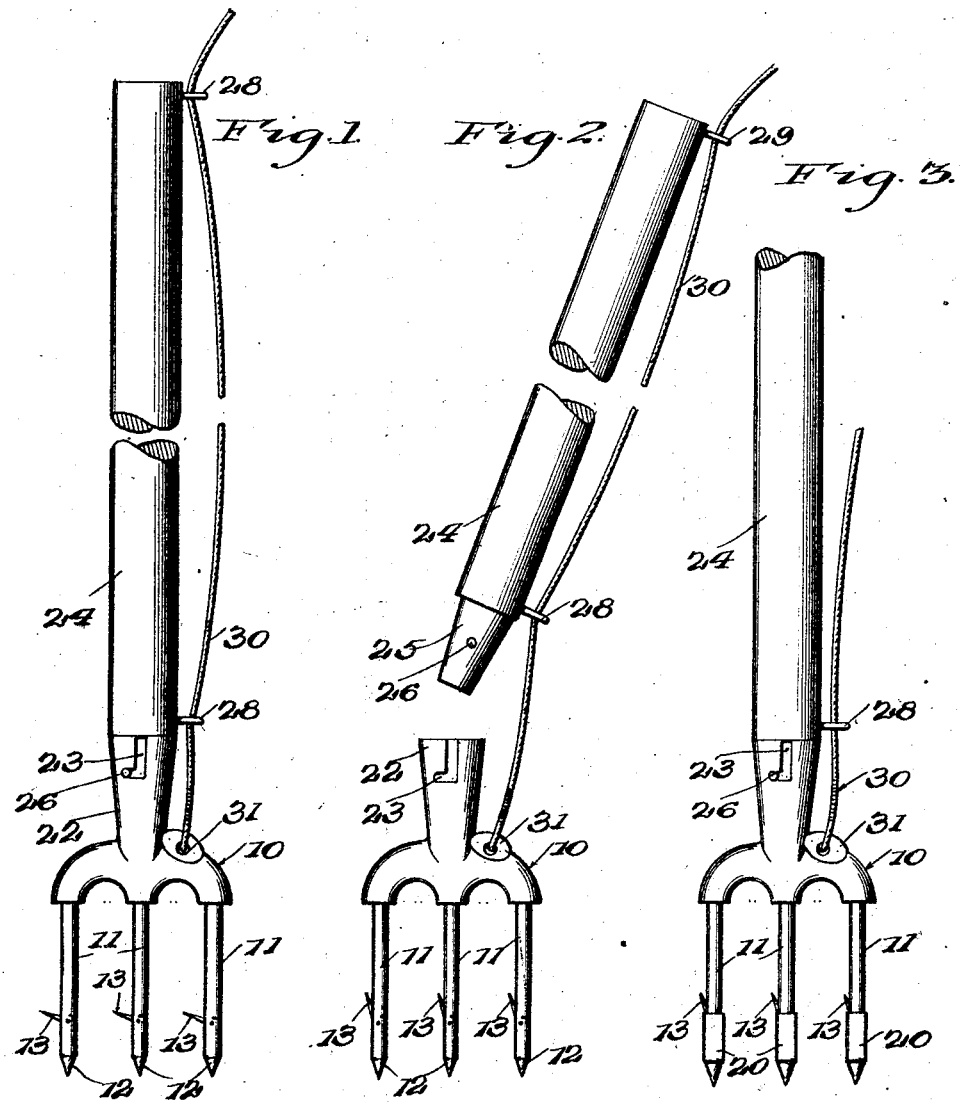

1,581,321

UNITED STATES PATENT OFFICE.

FRANK EBERHARDT RAITHEL, OF JEFFERSON CITY, MISSOURI.

FISH GIG.

Application filed October 17, 1923. Serial No. 669,144.

*To all whom it may concern:*

Be it known that I, FRANK E. RAITHEL, a citizen of the United States, and a resident of Jefferson City, in the county of Cole and State of Missouri, have invented certain new and useful Improvements in Fish Gigs, of which the following is a specification.

This invention relates to an improvement in fish gigs, and has for its object to provide a device of this character that is so constructed and organized as to permit the gig proper to be readily disassociated from its pole or handle, while preventing loss of the gig.

Another object is to provide a fish gig which may be readily removed from the fish without tearing the flesh of the fish or otherwise injuring the same.

A still further object is to provide a fish gig of this character having the foregoing advantages and capacities which is at the same time of simple and durable construction, well balanced so as to be susceptible of convenient and effective handling and easy and comparatively inexpensive to manufacture.

Other objects and advantages reside in certain novel features of the construction, arrangement and combination of parts which will be hereinafter more fully described and particularly pointed out in the appended claims, reference being had to the accompanying drawings forming a part of this specification, and in which—

Figure 1 is a view in elevation showing the preferred embodiment of the invention, with the pole connected to the gig proper;

Figure 2 is a similar view showing the pole disassociated from the gig;

Figure 3 is a fragmentary view, partly in elevation and partly in section, and showing the ferrules slipped over the ends of the prongs;

Figure 4 is a fragmentary detail view showing one of the prongs with the ferrule attached, parts being shown in elevation and other parts being shown in section for the sake of illustration;

Figure 5 is a view similar to Figure 4, with the ferrule detached and the barb protruding;

Figure 6 is a detail sectional view on the line 6—6 of Figure 4; and

Figure 7 is a detail perspective view of one of the ferrules.

Referring to the drawings wherein, for the sake of illustration, is shown the preferred embodiments of the invention, and more particularly to Figures 1 to 7, inclusive, the numeral 10 designates the body portion of the fish gig proper, which is preferably constructed of metal, and which has integrally formed therewith or suitably connected thereto one or more prongs 11, these prongs 11 being pointed at their outer ends, as indicated at 12.

Each prong 11 is provided with a longitudinally extending slot 12 which is preferably shaped as shown in Figures 4 and 5. In each slot 12 a barb 13 is pivotally mounted by means of a pivot pin 14 which extends through the prong and through the slot and also through an opening provided therefor in the barb 13. Each barb is pointed at its outer end as at 15, and is provided with a camming surface 16. The wide end of each barb has formed thereon a shoulder 17 co-operable in one position of the barb with a stop pin 18 mounted on the prong and traversing the slot 12.

When the prongs 11 enter the fish the barbs 13 are positioned as shown in Figure 4, although of course the ferrule, to be hereinafter described, is detached. When, however, the fish tends to pull away from the prongs the barbs swing outwardly to the position shown in Figure 5 to prevent the fish from pulling from the prongs. The outward swinging movement of the barbs is limited by the engagement of their shoulders 17 with the stop pins 18 as shown in Figure 5.

A ferrule 20 is provided for each prong 11 and is shaped and formed to snugly fit over the outer end of each prong. These ferrules are designed and adapted to facilitate the removal of the prongs from the fish and to enable the prongs to be taken from the fish without tearing or otherwise injuring the flesh thereof. They operate to this end by virtue of the fact that when they are slipped over the ends of the prongs their edges 21 coact with the camming surfaces 16 of the barbs to move the barbs from the position shown in Figure 5 to the position shown in Figure 4, wherein the barbs are retracted and are positioned within the slot 12 except for their pointed ends 15 which project for some extent from the prongs as shown in Figures 2, 3 and 4.

It is to be understood that the barbs 13 are preferably constructed of flat, solid pieces of metal.

The body portion 10 of the fish gig proper has integrally formed therewith or suitably connected thereto a socket 22 having an L-shaped slot 23 formed therein. A pole or handle 24 is provided and has one end tapered and reduced, as at 25, so as to be adapted to loosely fit in the socket 22. A pin 26 is secured to the reduced and tapered end 25 and is adapted to coact with the L-shaped slot 23 of the socket 22 to provide a bayonet joint between the pole and socket. The fastening means thus provided between the pole and the gig proper is adapted to be released by slightly turning the pole or handle 24 relative to the gig, that is, by turning this pole 24 to the right as viewed in Figures 1, 2 and 3 relative to the gig.

In order to prevent loss of the parts of the gig the pole 24 is provided with a series of guides, which may be conveniently constituted of screw eyes 28 threaded into the pole or handle 24 and a cord, rope or other form of flexible connection 30 is extended through the openings of the eyes 28 and is connected, as at 31, to the body portion 10 of the fish gig. This cord or rope 30, while permitting the handle or pole 24 to be disassociated from the socket 22 as shown in Figure 2, prevents the gig from being entirely disconnected from the pole and thus insures against loss of the parts of the fish gig.

I claim:

1. In combination, a fish gig having a prong provided with a movable barb, and a ferrule having one end closed and also having an open end adapted to be slipped over the end of the prong and the barb thereof when it is desired to remove the gig from the fish.

2. In combination, a fish gig having a prong provided with a slot, a barb pivotally mounted in the slot and a stop pin for limiting the outward movement of the barb, said barb having a camming surface, and a ferrule co-operable with the curved surface to cam the barb back into the slot and hold the same therein.

FRANK EBERHARDT RAITHEL.